(12) United States Patent
Wick et al.

(10) Patent No.: US 12,547,894 B2
(45) Date of Patent: Feb. 10, 2026

(54) ENTROPY-BASED ANTI-MODELING FOR MACHINE LEARNING APPLICATIONS

(71) Applicant: Oracle International Corporation, Redwood Shores, CA (US)

(72) Inventors: Michael Louis Wick, Lexington, MA (US); Ariel Gedaliah Kobren, Cambridge, MA (US); Swetasudha Panda, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 501 days.

(21) Appl. No.: 17/940,549

(22) Filed: Sep. 8, 2022

(65) Prior Publication Data

US 2023/0368015 A1     Nov. 16, 2023

Related U.S. Application Data

(60) Provisional application No. 63/341,609, filed on May 13, 2022.

(51) Int. Cl.
| | |
|---|---|
| *G06F 40/20* | (2020.01) |
| *G06F 40/279* | (2020.01) |
| *G06F 40/30* | (2020.01) |
| *G06N 3/044* | (2023.01) |
| *G06N 3/08* | (2023.01) |
| *G06N 3/084* | (2023.01) |
| *G06N 3/0985* | (2023.01) |

(52) U.S. Cl.
CPC ............. *G06N 3/08* (2013.01); *G06F 40/279* (2020.01)

(58) Field of Classification Search
None
See application file for complete search history.

(56) References Cited

U.S. PATENT DOCUMENTS

| | | | |
|---|---|---|---|
| 12,124,814 B2 * | 10/2024 | Perez | ...................... G06F 40/58 |
| 2021/0383254 A1 * | 12/2021 | Renders | ................. G06N 3/045 |
| 2022/0319506 A1 * | 10/2022 | Heikinheimo | ........ G10L 15/065 |

OTHER PUBLICATIONS

Norouzi, Mohammad, NIPS-2016-reward-augmented-maximum-likelihood-for-neural-structured 2016, Google Brain Advances In Neural Information Processing Systems, 2016 proceedings.neurips.cc (Year: 2016).*

* cited by examiner

*Primary Examiner* — Pierre Louis Desir
*Assistant Examiner* — Kristen Michelle Masters
(74) *Attorney, Agent, or Firm* — Invoke

(57) ABSTRACT

Techniques are described herein for training and applying machine learning models. The techniques include implementing an entropy-based loss function for training high-capacity machine learning models, such as deep neural networks, with anti-modeling. The entropy-based loss function may cause the model to have high entropy on negative data, helping prevent the model from becoming confidently wrong about the negative data while reducing the likelihood of generalizing from disfavored signals.

20 Claims, 6 Drawing Sheets

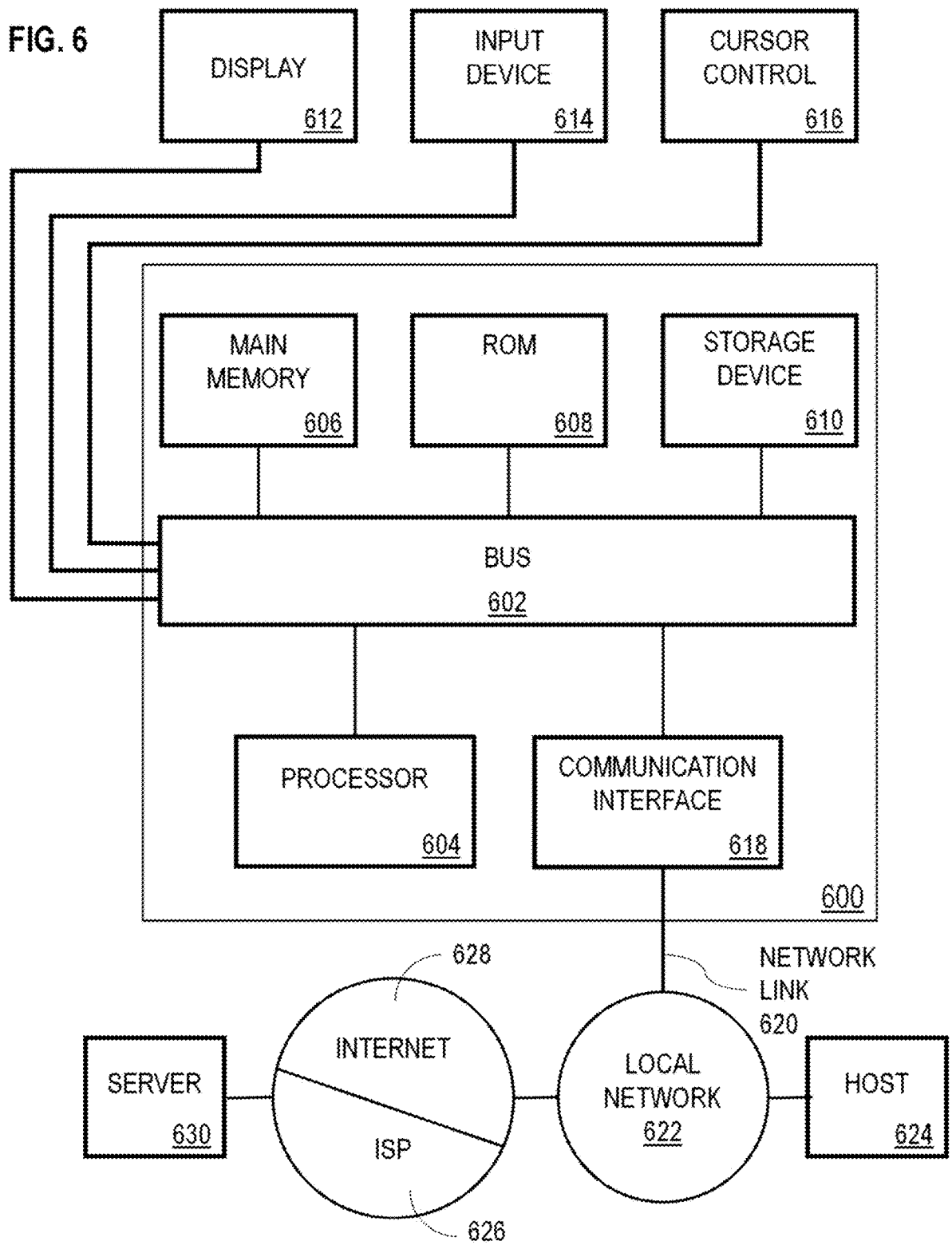

ENTROPY-BASED ANTI-MODELING FOR MACHINE LEARNING APPLICATIONS

BENEFIT CLAIMS; CROSS-REFERENCES TO RELATED APPLICATIONS

This application claims the benefit of U.S. Provisional Patent Application 63/341,609, filed May 13, 2022, which is hereby incorporated by reference.

This application is related to U.S. application Ser. No. 16/890,097, titled "Removing Undesirable Signals from Language Models Using Negative Data", which is herby incorporated by reference.

TECHNICAL FIELD

The present disclosure relates to machine learning. In particular, the present disclosure relates to techniques for training and applying machine learning models.

BACKGROUND

In the field of machine learning, models, such as deep neural networks, are built by learning and generalizing from training data. In some cases, models may extrapolate based on spurious signal in the training data and consequently generalize inappropriately on the test data. This problem is referred to as overgeneralization and may negatively impact the robustness of a machine learning model.

One approach to address the problem of overgeneralization is to incorporate anti-modeling into the training process. The goal of anti-modeling is to simultaneously optimize two objectives. The first is to achieve a high likelihood on the positive data, which may be assumed to have both favored signals from which a model may generalize correctly and disfavored signals from which the model may generalize inappropriately. The second objective is to achieve low likelihood on negative data that includes only the disfavored signals, thereby preventing or negating the model from learning these signals. With respect to the second objective, it is generally not feasible to minimize the likelihood of the negative data directly because doing so would result in a degenerate loss function that is not bounded from below. Instead, anti-modeling techniques may incorporate a term into the loss function, referred to as the "unlikelihood" objective, to achieve low likelihood on the negative data. While this approach successfully reduces the likelihood on the negative data, it is oftentimes too aggressive. In particular, the model may learn to be confidently wrong about predictions on the negative data, which may reduce the model's accuracy.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 is a block diagram that illustrates a computer system upon which some embodiments may be implemented.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques are described herein for training and applying machine learning models. The techniques include implementing an entropy-based loss function for training high-capacity machine learning models, such as deep neural networks, with anti-modeling. The entropy-based loss function influences the model to have high entropy on negative data, helping prevent the model from becoming confidently wrong about the negative data while reducing the likelihood of generalizing from disfavored signals.

The negative effects resulting from a model learning to be confidently wrong about predictions on negative data may be demonstrated with reference to equation (1) below:

$$\hat{W} = \operatorname*{argmax}_{W} \prod_{x \in D} p(x|W) \times \left( \prod_{\bar{x} \in \bar{D}} 1 - p(\bar{x}|W) \right)^{\alpha} \quad (1)$$

Equation (1) represents a function for minimizing the combined loss to achieve a high likelihood on the positive data D and a low likelihood on the negative data $\bar{D}$. The first part of the equation ($\Pi_{x \in D} \, p(x|W)$) is the likelihood term and represents a first product of probabilities over positive data examples, where x represents an example from the positive training data D. The second part of the equation (($\Pi_{\bar{x} \in \bar{D}} 1 - p(\bar{x}|W))^{\alpha}$)) is the unlikelihood term and represents a second product of probabilities over negative data examples, where $\bar{x}$ represents an example from the negative training data $\bar{D}$ and α controls a balance between the likelihood and unlikelihood terms.

Figure 1:
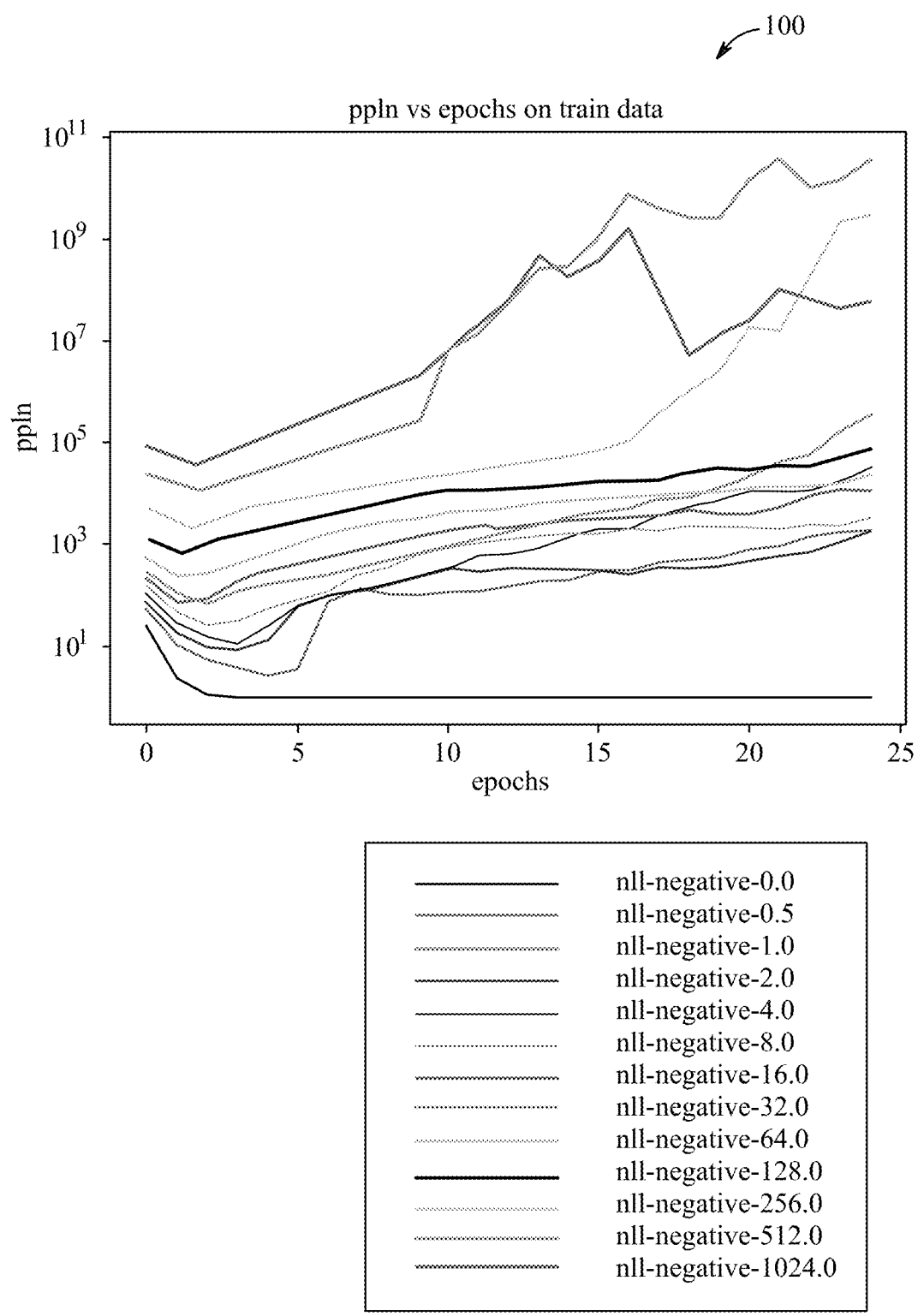
FIG. 1 illustrates a graph of the perplexity on the negative data from anti-modeling using the unlikelihood loss function.

FIG. 1 illustrates graph 100 of the perplexity on the negative data (ppln) from anti-modeling using the unlikelihood loss function. A vocabulary size of 10,000 was used during training of a neural network language model. The number at the end of each name in the legend indicates different settings for α in the loss function. As illustrated, the unlikelihood term in the loss function causes the ppln to greatly exceed the vocabulary size threshold for most values of α. Thus, the perplexity of the language model balloons to numbers that are unacceptably large. In particular, the unlikelihood loss goads the model to put a low probability on the observed negative output and high probability on anything else. The result is a distribution with extremely low entropy that is confidently wrong on negative data.

Embodiments described herein include training machine learning models using a loss function with an entropy-based component. The entropy-based component may be constructed such that the model is confused or "perplexed" by negative data rather than becoming confidently wrong about the output. The model's confusion may be measured by the perplexity metric, which is greater than or equal to 1. A perplexity of k means that the model has a 1/k chance of predicting an output label correctly. That is, the model's chances are the same as rolling a k-sided die. Thus, when predicting words using a language model, if k is equal to the vocabulary size V, then the model is completely confused about what possible word to predict. A perplexity significantly higher than k may skew the distribution to be confidently wrong on the negative data as previously illustrated. The entropy-based component of the loss function may achieve a low likelihood on the negative data while preventing the perplexity from exceeding a threshold amount, which may be based on the vocabulary size.

One or more embodiments described in this Specification and/or recited in the claims may not be included in this General Overview section.

2. Architectural Overview

Figure 2:
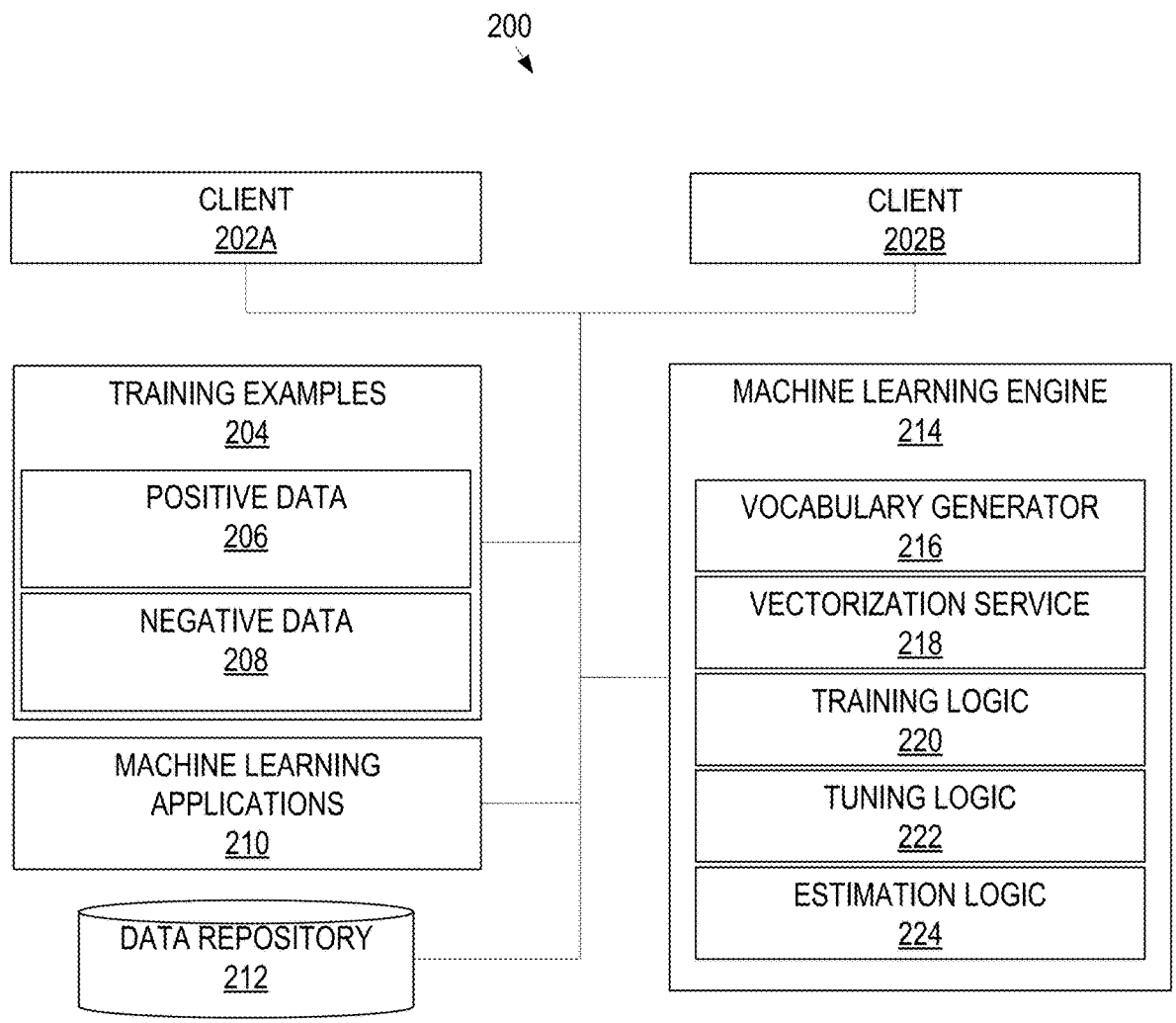
FIG. 2 illustrates an example system architecture for implementing the machine learning techniques described herein in accordance with some embodiments.

FIG. 2 illustrates an example system architecture for implementing the machine learning techniques described herein in accordance with some embodiments. As illustrated in FIG. 2, system 200 includes clients 202a-b, training examples 204, machine learning applications 210, data repository 212, and machine learning engine 214. System 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

Machine learning engine 214 provides components through which inferences may be automatically made during system runtime rather than relying on static instruction sets to perform tasks. In some embodiments, machine learning engine 214 may be configured to automatically learn and infer patterns to make predictions and trigger the execution of tasks. For example, machine learning engine 214 may train and apply language models for estimating the relative likelihood of different words and phrases. A language model may be built using one or more high-capacity machine learning models, such as deep neural networks. A language model built using neural networks may be referred to as a neural language model.

In some embodiments, machine learning engine 214 builds a language model using training examples 204, which include positive data 206 and negative data 208. Positive data 206 may include examples with favored signals for a machine learning model to learn, and negative data 208 may include examples of disfavored signals. The disfavored signals may also be present within positive data 206. However, training using anti-modeling based on the negative signals may prevent the machine learning model from generalizing based on the disfavored signals.

In some embodiments, machine learning engine 214 includes vocabulary generator 216, which constructs a vocabulary based on training examples 204. Vocabulary generator 216 may tokenize the training examples 204 and add the tokens to a vocabulary. Thus, the vocabulary may comprise a set of tokens, where each token is a data object, such as a string value, that identifies one or more words. A token that uniquely identifies a single word may be referred to as unigram, and a sequence of two or more words may be referred to as an n-gram.

Machine learning engine 214 may further include vectorization service 218, which is configured to generate machine learning vector representations based on the vocabulary. A machine learning vector representation may be a set of numerical values that facilitate processing by other components of machine learning engine 214. In some embodiments, each unique token may be mapped to a unique vector representation. A word embedding model, such as Word2Vec, may be used to map unigrams and/or n-grams to numerical representations in a vector space. A word embedding may be a vector representation that is generated based on contextual information including semantics, where words with similar meanings are mapped more closely together within the vector space. However, other text vectorization techniques, such as one hot encoding and bag-of-words modeling, may be used to generate the feature vectors without factoring in semantic meanings of the words. Thus, the manner in which vectors are formed as a function of a token may vary depending on the particular implementation.

Machine learning engine 214 may further include training logic 220 for training a machine learning model. In some embodiments, training logic 220 receives, as input, training examples 204, including positive data 206 and negative data 208. Based on the positive and negative training data, training logic 220 may set and adjust weights and/or other parameters for a machine learning model. For example, training logic 220 may adjust the weights and bias values of cells within a neural network to minimize a loss function.

Machine learning engine 214 may further include tuning logic 222 for adjusting and refining model hyperparameters to optimize the model accuracy. For example, tuning logic 222 may train multiple candidate neural network models using varying model hyperparameter sets. Tuning logic 222 may determine which model yields the lowest prediction/estimation error on average and select these parameters to evaluate new queries.

Machine learning engine 214 may further include estimation logic 224 for evaluating new examples that were not included in the training dataset and estimating labels. For example, estimation logic 224 may predict one or more words or sentences that should be included in a sentence or phrase that was not previously seen by system 200. Estimation logic 224 may apply the trained machine learning model to the new example to estimate the label, where the label may include one or more predicted words.

In some embodiments, machine learning applications 210 interface with or integrate machine learning engine 214 to perform one or more actions based on the outputs generated by the trained machine learning models. For example, the output of a neural language model may be used to perform one or more tasks, including speech recognition, predictive query or sentence completion, translation between different languages, and optical character recognition. Additionally or alternatively, the output of a language model may be used by one or more downstream machine learning models to perform other predictions and tasks.

In some embodiments, clients 202*a* and 202*b* interact with components of system 200 to direct operations and/or access data generated by the other components. For example, a client may include an interface through which a developer may submit hyperparameters, training examples, and/or other data relevant to training a machine learning model. As another example, a client may include an interface for accessing and presenting predictions, analytics, and/or other data output as a function of the machine learning processes.

In some embodiments, machine learning engine 214 is integrated into a cloud service, such as a software-as-a-service (SaaS) or a web service. Clients, such as clients 202*a-b*, may be a web browser, mobile application, or other software application communicatively coupled to a network. A client may interact with cloud services using one or more communication protocols, such as the hypertext transfer protocol (HTTP) and/or other communication protocols of the Internet Protocol (IP) suite. In other embodiments, machine learning engine 214 may be locally accessible to a user, such as a desktop or other standalone application. Additional embodiments and/or examples relating to computer networks and microservice applications are described below in Section 5, titled *Computer Networks and Cloud Networks* and Section 6, titled *Microservice Applications*.

In some embodiments, one or more components of system 200 may include a frontend interface for interacting with a user. A frontend interface may be configured to render user interface elements and receive input via user interface elements. For example, a frontend interface may generate webpages and/or other graphical user interface (GUI) objects. Client applications, such as web browsers, may access and render interactive displays in accordance with protocols of the IP suite. Additionally or alternatively, a frontend interface may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

Components of system 200 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Entropy-Based Anti-Modeling 3.1 Example Loss Function for Inducing Confusion on Negative Signals As previously noted, training data may include positive data and negative data. Positive data generally comprises training examples with positive signals that are desirable for a model to learn. In the context of a language model, for instance, positive data may include a corpus of text comprising sentences and/or phrases that are well-formed semantically, syntactically, and grammatically. The language model may be trained to learn these positive signals and extrapolate from them to predict unigrams or n-grams that follow correct semantic, syntactic, and grammatic patterns.

However, positive data may also include negative signals, which are undesirable for a model to learn. In some cases, negative signals may stem from misleading n-gram statistics. For example, an ungrammatical local n-gram may occur more frequently in the training data than a grammatical n-gram. Without anti-modelling, these negative signals may cause a model to inaccurately assign a higher probability to an ungrammatical version of a sentence than a grammatical version of the sentence.

The negative effects of extrapolating from n-gram statistics may be appreciated with respect to long-distance syntactic dependencies. For instance, an example sentence with a long-distance syntactic dependency is: "Zach and Chloe, after playing soccer with Jamie, are going to lunch." The agreement between the subject ("Zach and Chloe") and the verb tense ("are going") may be classified as long distance because there is a significant clause ("after playing soccer with Jamie"), or attractor, between the subject and verb. For models that have negative n-gram signals inherently biasing the model, the model may be more likely to predict "Jamie is going to lunch" without considering the actual subject of the sentence ("Zach and Chloe") because of the separation.

In some embodiments, the training process uses anti-modeling on negative data to negate or unlearn negative signals that are present in the positive data. Negative training data may include a set of training examples with negative signals to unlearn or induce confusion within the model. The negative training data may include little or no positive signals such that positive inferences are not unlearned by the model. In the context of a language model, negative data may include sentences and/or phrases that are semantically, syntactically, and/or grammatically incorrect. For instance, a negative example may be: "Zach and Chloe, after playing soccer with Jamie, is going to lunch." The negative training data may effectively cause the model to unlearn or negate misleading n-gram statistics and other negative signals that bias the model to overgeneralize and generate erroneous predictions. The techniques described herein include a specialized loss function to ignore problematic signals, which may be present in the positive data, while maintaining the ability to learn and extrapolate from positive semantic, syntactic, and grammatic signals.

In some embodiments, training logic 220 implements a specialized loss function for inducing confusion on negative signals during training. The loss function may be defined based on the size of the vocabulary. For example, the loss function may cause the model to have a perplexity equal to or near the vocabulary size V for strong negative signals. A perplexity equal to the vocabulary size V may represent a state of complete confusion where the model does not know what possible word to predict for a masked word. In this case, the model's probability distribution over the vocabulary is as high as permitted by the loss function, which may be equal to the uniform distribution $U(x;V)=1/V$.

Equation (2) illustrates an example loss function in accordance with some embodiments. Equation (2) replaces the unlikelihood component of Equation (1) with an entropy-based component as follows:

$$\hat{W} = \underset{W}{\operatorname{argmax}} \prod_{x \in D} p(x|W) \times \left( \prod_{\bar{x} \in \bar{D}} \exp\left(-H(p \cdot |(\bar{x}|W))\right) \right)^{\alpha} \quad (2)$$

As with equation (1), the first component ($\Pi_{x \in D}$ p(x|W)) in equation (2) is the likelihood term and represents a first product of probabilities over positive data examples, where x represents an example from the positive training data D. The second part, $((\Pi_{\bar{x} \in \bar{D}} \exp(-H(\cdot|\bar{x}|W))))^{\alpha}$, is the entropy term, where $\bar{x}$ represent an example from the negative training data $\bar{D}$, $\alpha$ controls a balance between the likelihood and entropy terms, and H(p) is the Shannon entropy.

The Shannon entropy function is defined in equation (3) as follows:

$$H(p \cdot |(x|W)) = -\sum_{v \in V} p(v|x, W) \log\left( p(v|x, W) \right) \quad (3)$$

where v is a token in vocabulary V and the entropy term sums the possible values within the vocabulary. Entropy may be conceptually defined as how much information is produced on average for each token in the vocabulary. As illustrated, the entropy component of equation (2) computes a product of the exponent of the entropy, which effectively increases the entropy of the distribution for negative data so that the distribution is close to uniform, as represented by U(x; V)=1/V.

The loss function may be used to perform anti-modeling to negate or "unlearn" negative signals picked up on in the positive training data. As previously noted, the unlikelihood component of the loss function of equation (1) may result in probabilities significantly lower than 1/V, which may unacceptably skew the probability higher for other tokens within the vocabulary. With the entropy-based component depicted in equations (2) and (3), the model may be trained such that the negative signal does not affect the probability of selecting a token. That is, each token may be equally likely to be selected based on a negative signal with a probability of 1/V. Thus, the entropy-based component avoids scenarios in which a negative signal produces a distribution with low entropy that is confidently wrong.

3.2 Model Training

Figure 3:
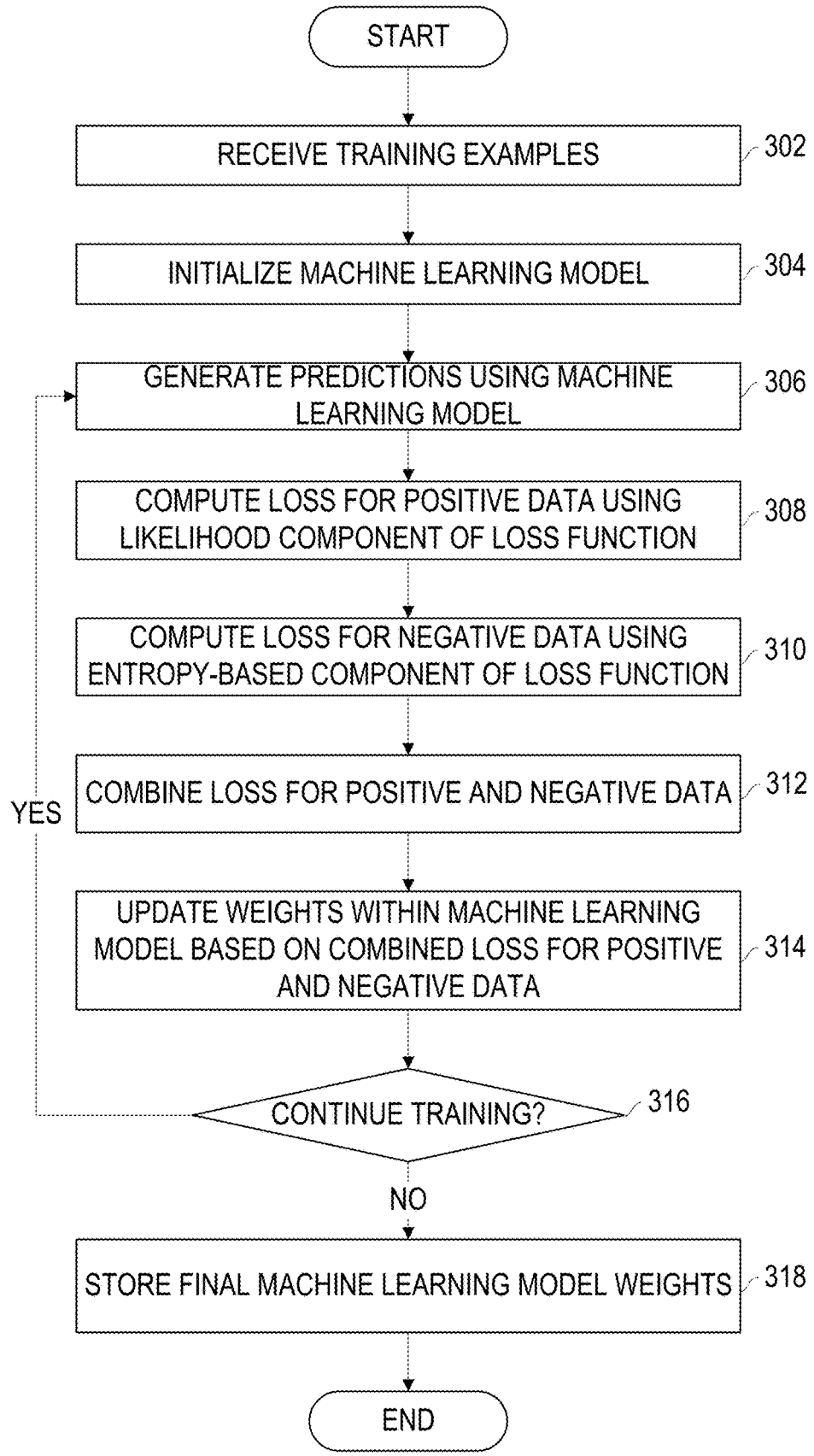
FIG. 3 illustrates an example set of operations for training a machine learning model using entropy-based anti-modeling in accordance with some embodiments.

FIG. 3 illustrates an example set of operations for training a machine learning model using entropy-based anti-modeling in accordance with some embodiments. One or more operations illustrated in FIG. 3 may be modified, rearranged, or omitted. Accordingly, the particular sequence of operations illustrated in FIG. 3 should not be construed as limiting the scope of one or more embodiments.

Referring to FIG. 3, the training process receives a set of training examples (operation 302). When training a neural language model, for example, a training dataset may include a corpus of data in a target language. Positive training examples may include articles and/or other electronic documents known to include well-written, coherent sentences and/or phrases. Training from the positive data allows the model to learn and extrapolate from positive signals, such as semantic, syntactic, and grammatical patterns. However, as previously noted, the positive data may include spurious, negative signals, such as misleading n-gram statistics, that are undesirable for the model to learn.

Negative training examples may include documents with poorly structured, incoherent sentences and/or phrases. In some embodiments, the negative data may be generated based on the positive training examples, such as generating random permutations of sentences in the positive data. Random permutations generated from the positive examples have a high likelihood of generating sentences and phrases that are incorrect semantically, syntactically, and grammatically. Intentionally generating incoherent sentences provides a source of negative signals to unlearn and induce confusion without negating the positive signals in the positive data. For example, random permutations are likely to maintain similar n-gram statistical patterns while resulting in incorrect semantic, syntactic, and grammatic sentence structures. Thus, the positive signals may effectively be removed to generate the negative data.

The training process further initializes a machine learning model to prepare the model for training (operation 304). When training a neural network, the cell state of individual neurons within the network, including the cell weights and/or biases, may be initialized with randomly selected values. In other cases, predetermined initial values may also be used for the cell states. Similarly, for other types of machine learning models, random weights and/or other model parameters may be selected or predefined.

The training process next generates predictions for the training examples using the machine learning model (operation 306). In some embodiments, the predictions are generated by generating one or more feature vectors for each training example and applying the machine learning model to the feature vectors. As previously noted, a word embedding model may be used to generate numerical feature vectors such that tokens with similar semantic meanings are mapped more closely within a vector space than vectors with dissimilar meanings. The machine learning model may then predict a unigram or n-gram as a function of a feature vector.

With respect to a neural language model, for instance, the training process may randomly mask one or more words in each training example. The training process may vectorize the sequence of words in the examples and perform a forward pass that feeds the vector into the model. A cell in the model may apply a weight and/or bias to one or more input values, which may correspond to vectorized inputs from the training example and/or the output of other components within the neural network, such as other cells. The cell may compute a weighted sum and apply an activation function generate an output. An output or softmax layer in the neural network may receive the outputs from cells in one other more other layers and assign probabilities to each token in a vocabulary representing the predicted likelihood that the token is the masked word.

Once the predictions have been generated, the training process computes the loss for the positive data using the likelihood component of the loss function (operation 308). The likelihood component of equation (2) above estimates how closely the distribution of predictions made by the model matches the distribution of target words in the training data. The likelihood component attempts to minimize the loss over the probability distribution.

The training process further computes the loss for the negative data using the entropy-based component of the loss function (operation 310). The entropy component of equation (2) above estimates how closely the distribution of predictions made by the model matches a high entropy distribution in the negative data. The entropy component attempts to minimize the loss by having a perplexity on the negative data roughly equal to the size of the vocabulary.

The training process combines the loss for the positive and negative data (operation 312). For example, the training process may apply equation (2) above to combine the loss.

Thus, the product of probabilities over the positive examples may be multiplied by the product of probabilities over the negative examples.

The training process further updates the weights within the machine learning model based on the combined loss for the positive and negative data (operation 314). In some embodiments, the process uses gradient descent techniques to update the weights. In some embodiments, the gradient of the loss function depicted in equation (2) is computed with respect to the weights of the neural network. The weights of the neural language model may be updated to minimize the combined loss.

An example stochastic gradient descent technique is backpropagation, although other techniques may be used to update the weights, depending on the particular implementation. Backpropagation is a process of updating cell states in the neural network based on gradients determined as a function of the estimation error. For example, the loss function depicted in equation (2) may be used to compute an estimation error of a language neural model when predicting one or more masked words in a sentence. The training process may then a assign a fraction of the estimated error to a cell in the neural network based on the cells contribution to the output. The weight and/or bias value of the cell may then be adjusted based on the fraction.

The training process determines whether to continue training (operation 316). In some embodiments, the training process iterates a predefined or dynamically-determined number of times to continue the gradient descent and converge on a point that minimizes the loss computed by the entropy-based loss function. Each iteration in the process may be referred to as a training epoch.

Once training is complete, the process stores the weight values that minimize the combined loss (operation 318). These model parameters may then be used to apply the machine learning model to new examples and generate corresponding predictions.

The stochastic gradient descent techniques described above may comprise code that minimizes equation (2), which may be used to compute the log loss for a neural network model. Thus, the log loss may have two components. The first component corresponds to the first product and represents the cross-entropy loss of a neural language model. The second corresponds to the entropy which may be implemented as follows. The logits or outputs of the neural language model from running a forward pass of a neural network on input sequence x may be represented as $y=f(x)$. The training process may compute the probabilities of each element in the sequence y, where the probabilities are represented as $p=\exp(y)$. The entropy portion of the loss may than be computed as $p^T y$. If running in batch mode, then p and y may be implemented as two-dimensional tensors, in which case, the training process may compute their element-wise product and then sum the resulting tensor to a single scalar to obtain the loss for an entire batch. The process may iterate as previously described to minimize the loss.

3.3 Model Tuning

Figure 4:
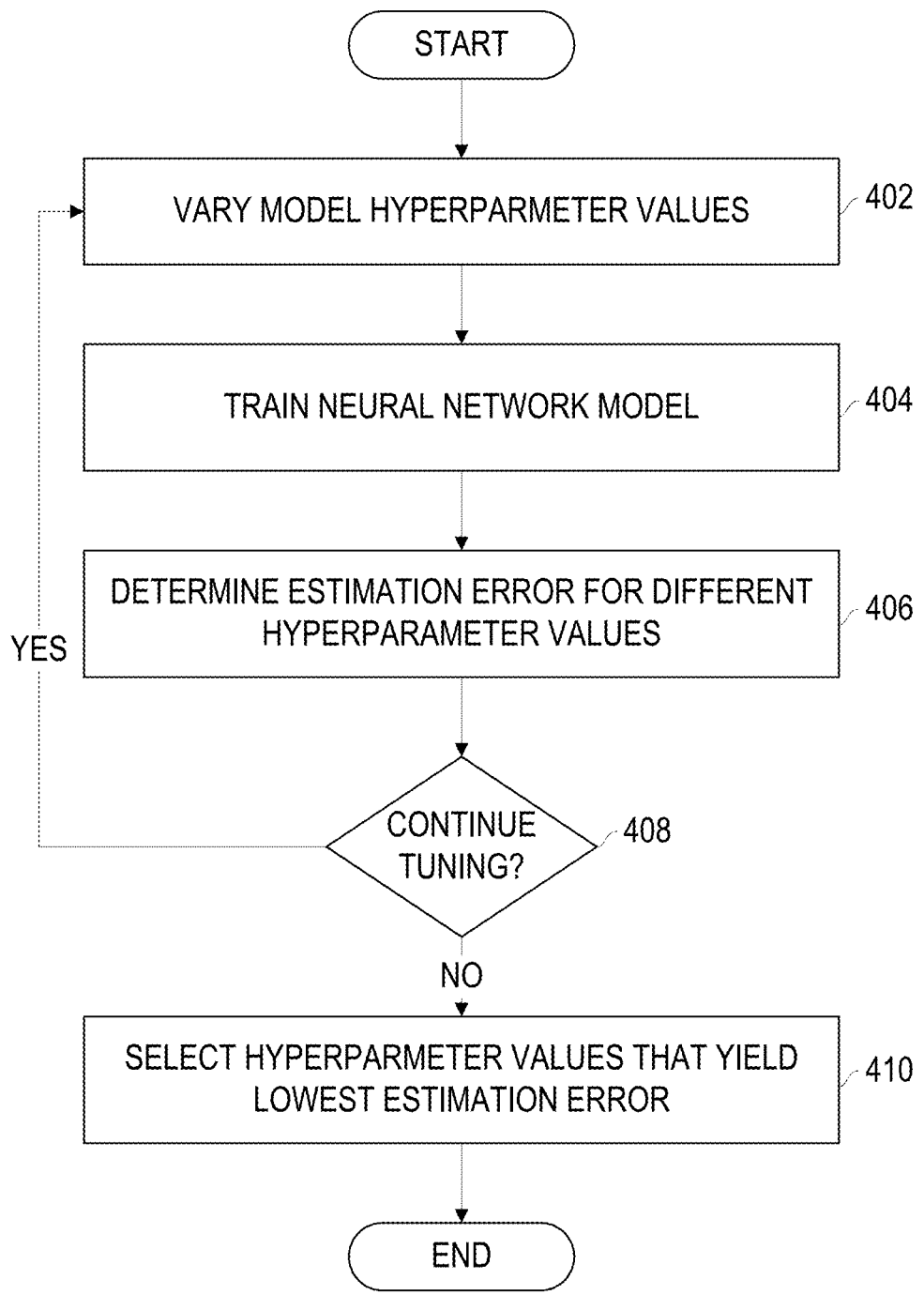
FIG. 4 illustrates an example set of operations for tuning a recurrent neural network in accordance with some embodiments.

In some embodiments, machine learning engine 214 may tune model hyperparameter values to optimize model performance. FIG. 4 illustrates an example set of operations for tuning a recurrent neural network in accordance with some embodiments. One or more operations illustrated in FIG. 4 may be modified, rearranged, or omitted. Accordingly, the particular sequence of operations illustrated in FIG. 4 should not be construed as limiting the scope of one or more embodiments.

The tuning process includes varying one or more hyperparameter values (operation 402). A hyperparameter in this context refers to a value that is set before training begins. Example hyperparameters that may be varied may include the number of training epochs, the value of alpha (which may control the learning rate for the negative data and the balance between the likelihood and entropy-based components), the embedding size of a word embedding model used to vectorize text, the word embedding features used to create the vector space, the number of cells within the neural network, and the activation functions in the cells.

The tuning process next trains one or more candidate machine learning models using the new hyperparameter value(s) (operation 504). For example, machine learning engine 214 may train one or more candidate neural language models having different values of alpha and/or other hyperparameters. The process depicted in FIG. 3 may be executed multiple times to train the candidate machine learning models.

The tuning process next determines the estimation error for the candidate model (operation 406). To determine the estimation error, the process may generate estimates for a testing dataset. A testing dataset may include examples that were not used to train the candidate models but for which labels are known. The tuning process may generate a prediction for each respective example in the testing dataset using the candidate model that was trained based on the new hyperparameter value(s) and compare it to the probability distributions in the testing datasets. The loss function depicted in equation (2) may be applied to compute the loss or error of the predictions.

The tuning process next determines whether to continue tuning (operation 408). For example, the tuning process may iterate through various combinations of hyperparameter values. Additionally or alternatively an estimation error threshold may be set where tuning may stop if the estimation error for one or more of the candidate models is below a threshold.

The tuning process next selects the candidate model with the lowest estimation error (operation 410). The selected model may then be used to evaluate new examples according to the corresponding hyperparameter values and the corresponding cell parameters obtained via the training process.

3.4 Perplexity Analysis

Figure 5:
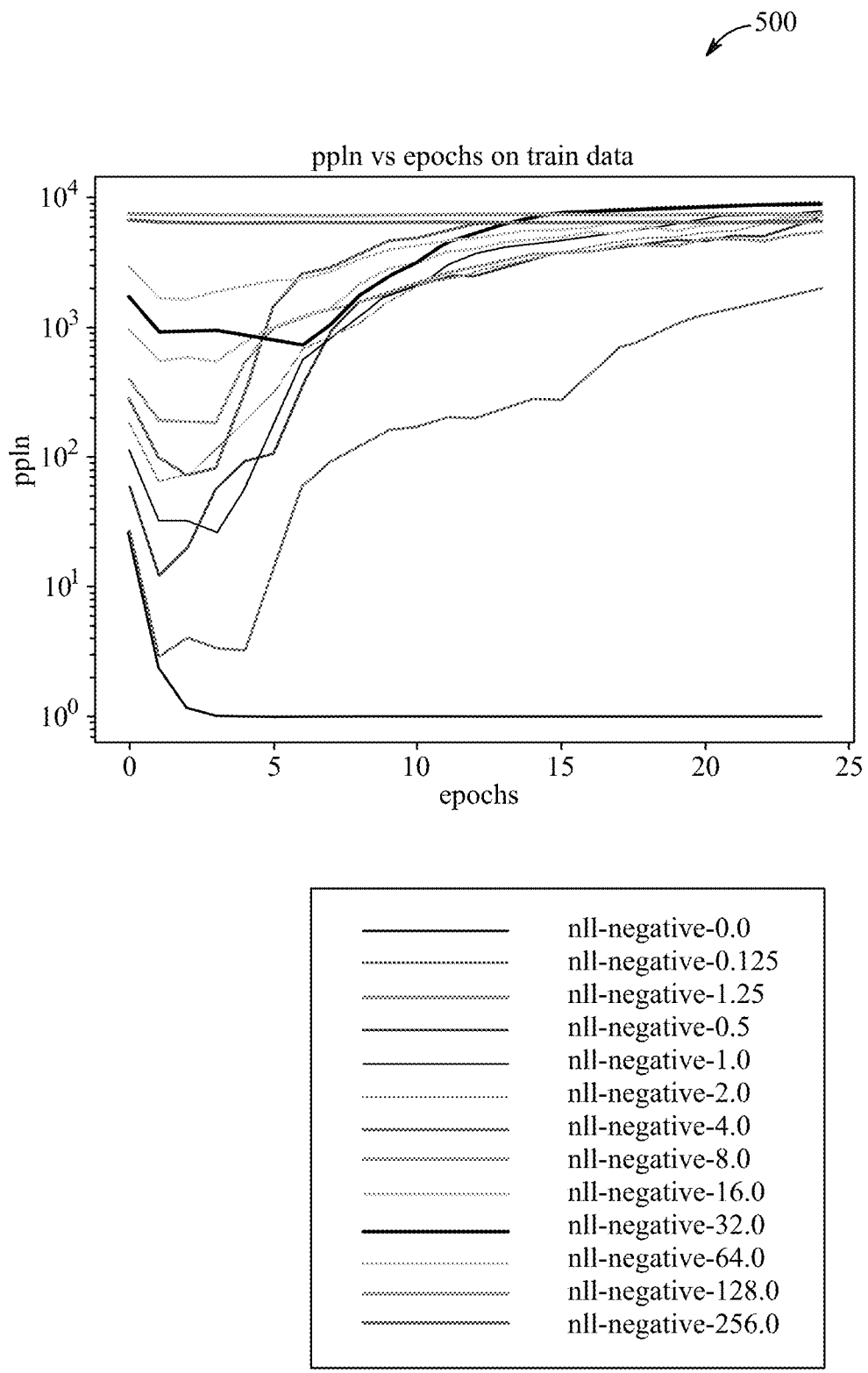
FIG. 5 illustrates a graph of the perplexity on the negative data from anti-modeling using an entropy-based loss function described in accordance with some embodiments.

FIG. 5 illustrates graph 500 of the perplexity on the negative data (ppln) from anti-modeling using the entropy-based loss function described above. A vocabulary size of 10,000 was used during training of a neural network language model. The number at the end of each name in the legend indicates different settings for a in the loss function. As illustrated, the entropy-based loss function allows the models to train such that the perplexity on the negative data never exceeds the vocabulary size.

Having a perplexity that does not exceed the vocabulary size helps prevent a model from placing extremely low probabilities on tokens based on negative signals, which may negatively impact the quality of model predictions. For example, there may be many instances of "Peter are . . . " in the negative training examples reflecting incorrect grammar. However, in some cases, it may be correct for "are" to follow a singular, such as when the singular is in a significant clause between the subject and verb as indicated above. Placing an extremely low probability on "are" in the entropy component may skew the results. With a perplexity equal to the vocabulary size, the token "are" is equally as likely to be chosen as any other token in the vocabulary when a negative signal indicates that the token is incorrect. Based on other positive signals, such as the existence of a long-distance syntactic dependencies, the model may assign "are" the highest probability in certain contexts without undue weight being given to the negative signals.

Although the examples illustrated herein restrict the perplexity to the size of a vocabulary, in other embodiments, the perplexity on the negative data may be restricted to other values. For example, the perplexity on the negative data may be restricted to twice the size of a vocabulary or some other threshold value, which may be computed as a function of the vocabulary size. Additionally or alternatively, the threshold may be exposed to and configurable by an end user.

In some embodiments, a threshold perplexity may be a hyperparameter value that is adjusted during model tuning. For example, different sets of threshold perplexity values may be used during the tuning process described above. The perplexity value that yields the lowest estimation error may be selected and used to apply the machine learning model.

4. Example Machine Learning Applications

A machine learning model trained according to the techniques described above may be used in one or more machine learning applications. As previously mentioned, example applications include speech recognition, predictive text completion, translation between different languages, and optical character recognition. Additionally or alternatively, the techniques may be integrated into other machine learning applications that use a vocabulary to generate predictions.

In some embodiments, the techniques described herein are used in pre-train and fine-tune paradigm for natural language processing. According to the paradigm, a language model may be pre-trained using the entropy-based loss function as described above. The language model may then be fine-tuned on a data set for a downstream task such as document classification or named entity recognition.

In some embodiments, applying the machine learning model comprises receiving a string or document of text with one or more masked or unknown words to predict. The input data may be tokenized and vectorized in the same manner as performed during the training process. A forward pass may then be performed using the stored model weights to assign a probability for one or more tokens in the vocabulary. The probability distribution may the be used to select one or more words to use for the application.

With speech recognition or optical character recognition, for instance, the model may be used to predict what word was uttered or written if the word was unclear or otherwise ambiguous. Speech recognition applications may convert audio signals to a string of text. Similarly, optical character recognition applications may convert image data to text. However, due to noise and/or other factors, the application may not be able to confidently detect one or more words in a sentence. The process may mask one or more words with a high level of uncertainty or that were not able to be converted, vectorize the remaining tokens in the sentence, and perform a forward pass using the feature vector to assign probabilities to each token in a vocabulary representing a predicted likelihood that the token is the masked word. The application may then select a word based on the probabilities assigned by the machine learning model. Thus, the prediction may help improve the accuracy of automated speech and character recognition systems.

As another example, the model may be used to predict what words a user will type next in an email, search engine, form, or other electronic document. The user may be presented with an option to add the predicted words to reduce the amount of input and overall time required to complete a sentence or phrase. Additionally or alternatively, the output of the machine learning model may be used to perform other downstream automated actions, which may vary between applications.

5. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates computer system 600 upon which some embodiments may be implemented. Computer system 600 includes bus 602 or other communication mechanism for communicating information, and hardware processor 604 coupled with bus 602 for processing information. Hardware processor 604 may be, for example, a general-purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT), for displaying information to a computer user. Input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes communication interface 618 coupled to bus 602. Communication interface 618 provides a two-way data communication coupling to network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   training a neural network using a set of training examples;
   wherein the set of training examples include positive data and negative data;
   wherein training the neural network comprises:
      determining, by at least one machine learning process, a size of a vocabulary associated with the set of training examples by identifying a number of n-grams to use for training; and
      updating, by the at least one machine learning process, a set of weights associated with a set of nodes within the neural network based at least in part on a loss function that includes a likelihood component and an entropy component, wherein the at least one machine learning process includes a learning process that trains the neural network by updating the set of weights to increase probabilities of a first set of tokens as a function of the positive data and an anti-modeling process that trains the neural network to unlearn signal learned from the positive data by updating the set of weights as a function of the negative data to decrease probabilities of a second set of tokens;
      wherein the entropy component restricts the anti-modeling process from updating the set of weights in a manner that causes an uncertainty of the neural network model when making predictions on negative signals to exceed a threshold, wherein the threshold is determined based at least in part on the size of the vocabulary; and
   executing a forward pass through the neural network, wherein the neural network applies the set of weights to assign at least one probability to at least one token in a vocabulary.

2. The method of claim 1, wherein the entropy component prevents the perplexity of the neural network on the negative data from exceeding the size of the vocabulary.

3. The method of claim 1, wherein the likelihood component computes a first loss as a function of predictions on the positive data and the entropy component computes a second loss as a function of predictions on the negative data; wherein the set of weights are updated based at least in part on a combination of the first loss and the second loss.

4. The method of claim 1, wherein the set of weights are updated to minimize the loss function that includes the likelihood component and the entropy component.

5. The method of claim 1, wherein updating the set of weights comprises: determining at least one gradient associated with the loss function; and updating weights for the set of nodes in the neural network based on the at least one gradient associated with the loss function.

6. The method of claim 1, wherein the neural network is a neural language model; the method further comprising applying the neural language model to predict one or more words within a set of text.

7. The method of claim 1, further comprising applying the neural network to perform at least one of speech recognition, predictive text prediction, translation, or optical character recognition.

8. The method of claim 1, wherein the entropy-based component negates at least one signal learned from the positive data.

9. The method of claim 1, further comprising: generating the vocabulary based at least in part on the set of training examples.

10. The method of claim 1, wherein the loss function is defined as:

$$\hat{W} = \underset{W}{\mathrm{argmax}} \prod_{x \in D} p(x|W) \times \left( \prod_{\bar{x} \in \bar{D}} \exp(-H(p \cdot |(\bar{x}|W))) \right)^{\alpha}.$$

11. One or more non-transitory computer-readable media storing instruction which, when executed by one or more hardware processors cause:
    training a neural network using a set of training examples;
    wherein the set of training examples include positive data and negative data;
    wherein training the neural network comprises:
       determining, by at least one machine learning process, a size of a vocabulary associated with the set of training examples by identifying a number of n-grams to use for training; and
       updating, by the at least one machine learning process, a set of weights associated with a set of nodes within the neural network based at least in part on a loss function that includes a likelihood component and an entropy component, wherein the at least one machine learning process includes a learning process that trains the neural network by updating the set of weights to increase probabilities of a first set of tokens as a function of the positive data and an anti-modeling process that trains the neural network to unlearn signal learned from the positive data by updating the set of weights as a function of the negative data to decrease probabilities of a second set of tokens;
       wherein the entropy component restricts the anti-modeling process from updating the set of weights in a manner that causes an uncertainty of the neural network model when making predictions on negative signals to exceed a threshold, wherein the threshold is determined based at least in part on the size of the vocabulary; and
    executing a forward pass through the neural network, wherein the neural network applies the set of weights to assign at least one probability to at least one token in a vocabulary.

12. The media of claim 11, wherein the entropy component prevents the perplexity of the neural network on the negative data from exceeding the size of the vocabulary.

13. The media of claim 11, wherein the likelihood component computes a first loss as a function of predictions on the positive data and the entropy component computes a second loss as a function of predictions on the negative data; wherein the set of weights are updated based at least in part on a combination of the first loss and the second loss.

14. The media of claim 11, wherein the set of weights are updated to minimize the loss function that includes the likelihood component and the entropy component.

15. The media of claim 11, wherein updating the set of weights comprises: determining at least one gradient associated with the loss function; and updating weights for the set of nodes in the neural network based on the at least one gradient associated with the loss function.

16. The media of claim 11, wherein the neural network is a neural language model; the method further comprising applying the neural language model to predict one or more words within a set of text.

17. The media of claim 11, applying the neural network to perform at least one of speech recognition, predictive text prediction, translation, or optical character recognition.

18. The media of claim 11, wherein the entropy-based component negates at least one signal learned from the positive data.

19. The media of claim 11, further comprising: generating the vocabulary based at least in part on the set of training examples.

20. A system comprising:
 one or more hardware processors;
 one or more non-transitory computer-readable media storing instruction which, when executed by the one or more hardware processors cause:
 training a neural network using a set of training examples;
 wherein the set of training examples include positive data and negative data;
 wherein training the neural network comprises:
  determining, by at least one machine learning process, a size of a vocabulary associated with the set of training examples by identifying a number of n-grams to use for training; and
  updating, by the at least one machine learning process, a set of weights associated with a set of nodes within the neural network based at least in part on a loss function that includes a likelihood component and an entropy component, wherein the at least one machine learning process includes a learning process that trains the neural network by updating the set of weights to increase probabilities of a first set of tokens as a function of the positive data and an anti-modeling process that trains the neural network to unlearn signal learned from the positive data by updating the set of weights as a function of the negative data to decrease probabilities of a second set of tokens;
 wherein the entropy component restricts the anti-modeling process from updating the set of weights in a manner that causes an uncertainty of the neural network model when making predictions on negative signals to exceed a threshold, wherein the threshold is determined based at least in part on the size of the vocabulary; and
 executing a forward pass through the neural network, wherein the neural network applies the set of weights to assign at least one probability to at least one token in a vocabulary.

* * * * *